US011443391B2

(12) United States Patent
Barendrecht et al.

(10) Patent No.: US 11,443,391 B2
(45) Date of Patent: Sep. 13, 2022

(54) AUTOMATED EMPLOYEE SELF-SERVICE AND PAYROLL PROCESSING FOR CHARITABLE CONTRIBUTIONS

(71) Applicant: ADP, Inc., Roseland, NJ (US)

(72) Inventors: Daniel Barendrecht, Rotterdam (NL); Vincent van Kooten, Rotterdam (NL)

(73) Assignee: ADP, Inc., Roseland, NJ (US)

( * ) Notice: Subject to any disclaimer, the term of this patent is extended or adjusted under 35 U.S.C. 154(b) by 23 days.

(21) Appl. No.: 16/785,101

(22) Filed: Feb. 7, 2020

(65) Prior Publication Data
US 2021/0248686 A1 Aug. 12, 2021

(51) Int. Cl.
*G06Q 40/00* (2012.01)

(52) U.S. Cl.
CPC ................. *G06Q 40/125* (2013.12)

(58) Field of Classification Search
None
See application file for complete search history.

(56) References Cited

U.S. PATENT DOCUMENTS

| 11,010,787 | B1* | 5/2021 | Tietzen | G06Q 30/0246 |
| 11,050,755 | B2* | 6/2021 | Zhang | G06Q 20/40 |
| 2002/0184148 | A1 | 12/2002 | Kahn et al. | |
| 2003/0014300 | A1 | 1/2003 | Franco et al. | |
| 2003/0093293 | A1* | 5/2003 | Han | G06Q 30/02 |
| | | | | 705/43 |
| 2004/0188221 | A1* | 9/2004 | Carter | G06Q 20/3437 |
| | | | | 194/215 |
| 2005/0021353 | A1 | 1/2005 | Aviles et al. | |
| 2007/0124163 | A1* | 5/2007 | Ehring | G06Q 30/0279 |
| | | | | 705/329 |
| 2010/0167704 | A1* | 7/2010 | Villemaire | H04M 3/4878 |
| | | | | 455/414.1 |
| 2012/0069131 | A1* | 3/2012 | Abelow | G06Q 30/02 |
| | | | | 345/589 |
| 2013/0151433 | A1 | 6/2013 | Hicks et al. | |
| 2014/0304186 | A1 | 10/2014 | Brown | |
| 2015/0206201 | A1* | 7/2015 | Worth | G06Q 20/00 |
| | | | | 705/12 |
| 2018/0330312 | A1* | 11/2018 | Martins | G06Q 10/083 |
| 2021/0065505 | A1* | 3/2021 | Rousseau | G07F 17/3211 |

OTHER PUBLICATIONS

Ruhland, "7 Steps In Payroll Management of Charitable Giving," Accuchex Blog, Mar. 5, 2015, https:/blog.accuchex.com/7-steps-in-payroll-management-of-charitable-giving, 6 pages.

\* cited by examiner

*Primary Examiner* — Fateh M Obaid
(74) *Attorney, Agent, or Firm* — Yee & Associates, P.C.

(57) ABSTRACT

An automated system and method of payroll processing for charitable contributions. A self-service user interface prompts an operator to identify preferences for charitable projects. A charitable giving profile for the operator is generated from the preferences for charitable projects identified by the operator. Suggested charitable projects for the operator are identified using the charitable giving profile for the operator. Project information for the suggested charitable projects is displayed on the self-service user interface. Pay for the operator, including a donation of funds from the pay for the operator to the suggested charitable projects, is automatically processed. Funds from the pay for the operator are automatically distributed to the suggested charitable projects.

18 Claims, 7 Drawing Sheets

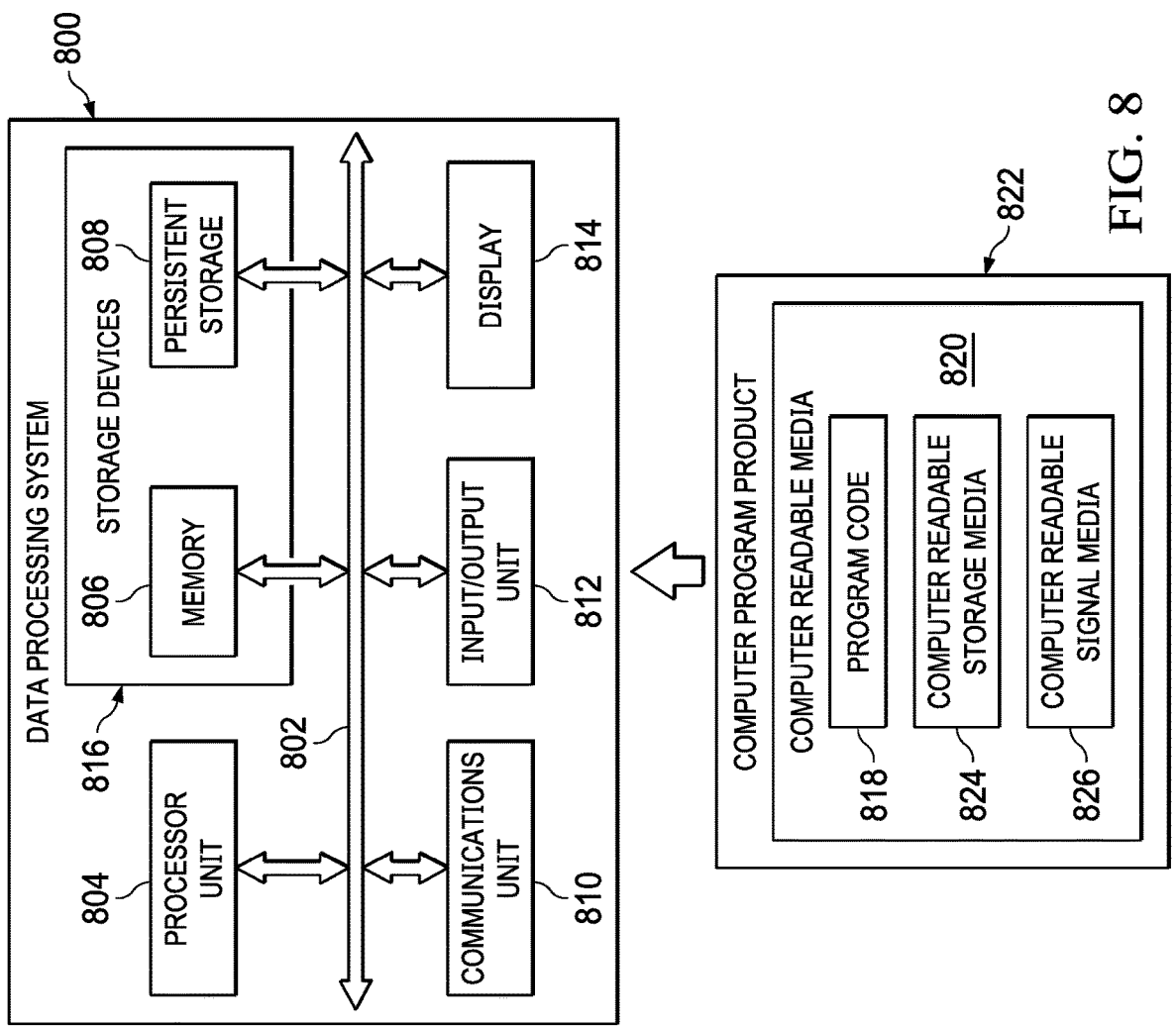
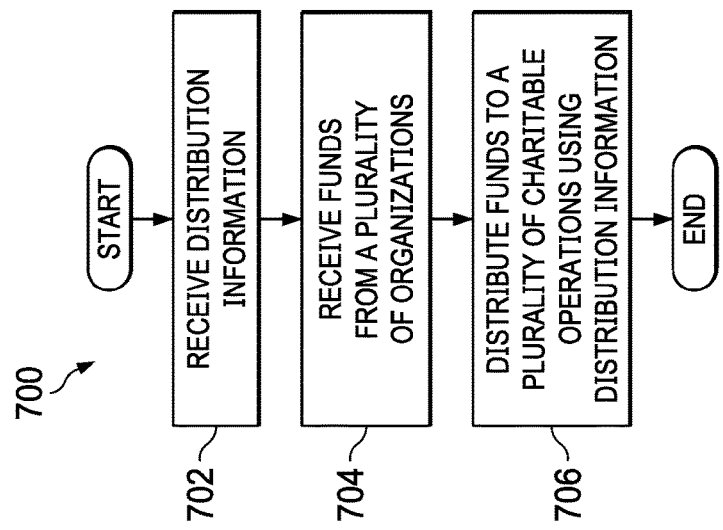

AUTOMATED EMPLOYEE SELF-SERVICE AND PAYROLL PROCESSING FOR CHARITABLE CONTRIBUTIONS

BACKGROUND INFORMATION

1. Field

The present disclosure relates generally to automated human resource management and payroll processing systems and methods. More particularly, the present disclosure relates to automated human resource management systems and methods including corporate social responsibility features for employee self-service making of charitable contributions and payroll processing for distributing funds from employee pay to charitable operations.

2. Background

A human resources management system, HRMS, comprises software implemented in a computer system that combines a number of systems and processes to facilitate the management of human resources, business processes and data. A human resources management system also may be referred to as a human resources information system, HRIS, or human capital management, HCM.

A human resources management system may include automated payroll processing functions. Automated payroll processing automates the pay process by gathering data on employee time and attendance, calculating various deductions and taxes, and generating periodic payments to employees, employee pay statements, and employee tax reports. Automated payroll processing can encompass employee pay-related transactions as well as integrate with existing financial management systems.

A human resources management system also may provide employee self-service, ESS, functions. Employee self-service functions provide employees access to their personal records and details and may allow employees to control certain aspects of their employment. It is desirable that employee self-service functions include features that allow employees to take more responsibility for their jobs and development.

Corporate social responsibility, CSR, is a type of private business self-regulation that aims to contribute to societal goals of a philanthropic, activist, or charitable nature. A common approach to corporate social responsibility is corporate philanthropy. Corporate philanthropy includes monetary donations and aid given to nonprofit organizations and communities. Donations are made in areas such as the arts, education, housing, health, social welfare and the environment, among others. Businesses and other organizations desire to satisfy corporate social responsibility commitments effectively and efficiently.

Accordingly, it would be beneficial to have a method and apparatus that take into account one or more of the issues discussed above as well as possibly other issues.

SUMMARY

An embodiment of the present disclosure provides an automated method of payroll processing for charitable contributions. A self-service user interface is displayed to prompt an operator to identify preferences for charitable projects. The preferences for charitable projects identified by the operator are received via the self-service user interface. A charitable giving profile for the operator is generated from the preferences for charitable projects identified by the operator. Suggested charitable projects for the operator are identified using the charitable giving profile for the operator. Project information for the suggested charitable projects is displayed on the self-service user interface. Pay for the operator, including a donation of funds from the pay for the operator to the suggested charitable projects, is automatically processed.

Another embodiment of the present disclosure provides an automated system for payroll processing of charitable contributions comprising a user interface generator, an input receiver, a charitable giving profile generator, a suggested charitable projects identifier, and a payroll processing system. The user interface generator is configured to generate a self-service user interface for display on a display device. The self-service user interface is configured to prompt an operator to identify preferences for charitable projects and includes a display of project information for suggested charitable projects for the operator. The input receiver is configured to receive the preferences for charitable projects identified by the operator via the self-service user interface. The charitable giving profile generator is configured to generate a charitable giving profile for the operator from the preferences for charitable projects identified by the operator. The suggested charitable projects identifier is configured to identify the suggested charitable projects for the operator using the charitable giving profile for the operator. The payroll processing system processes pay for the operator including a donation of funds from the pay for the operator to the suggested charitable projects.

Yet another embodiment of the present disclosure provides an automated method of payroll processing for charitable contributions. Distribution information that identifies a distribution of funds donated from pay of employees of a plurality of organizations to a plurality of charitable operations is generated. Pay for the employees of the plurality of organizations, including the funds donated from the pay of the employees, is automatically processed. The funds are received from the plurality of organizations. The funds are distributed to the plurality of charitable operations using the distribution information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a flowchart of a process for distributing funds to charitable operations in accordance with an illustrative embodiment; and FIG. 8 is an illustration of a block diagram of a data processing system in accordance with an illustrative embodiment.

DETAILED DESCRIPTION

Figure 1:
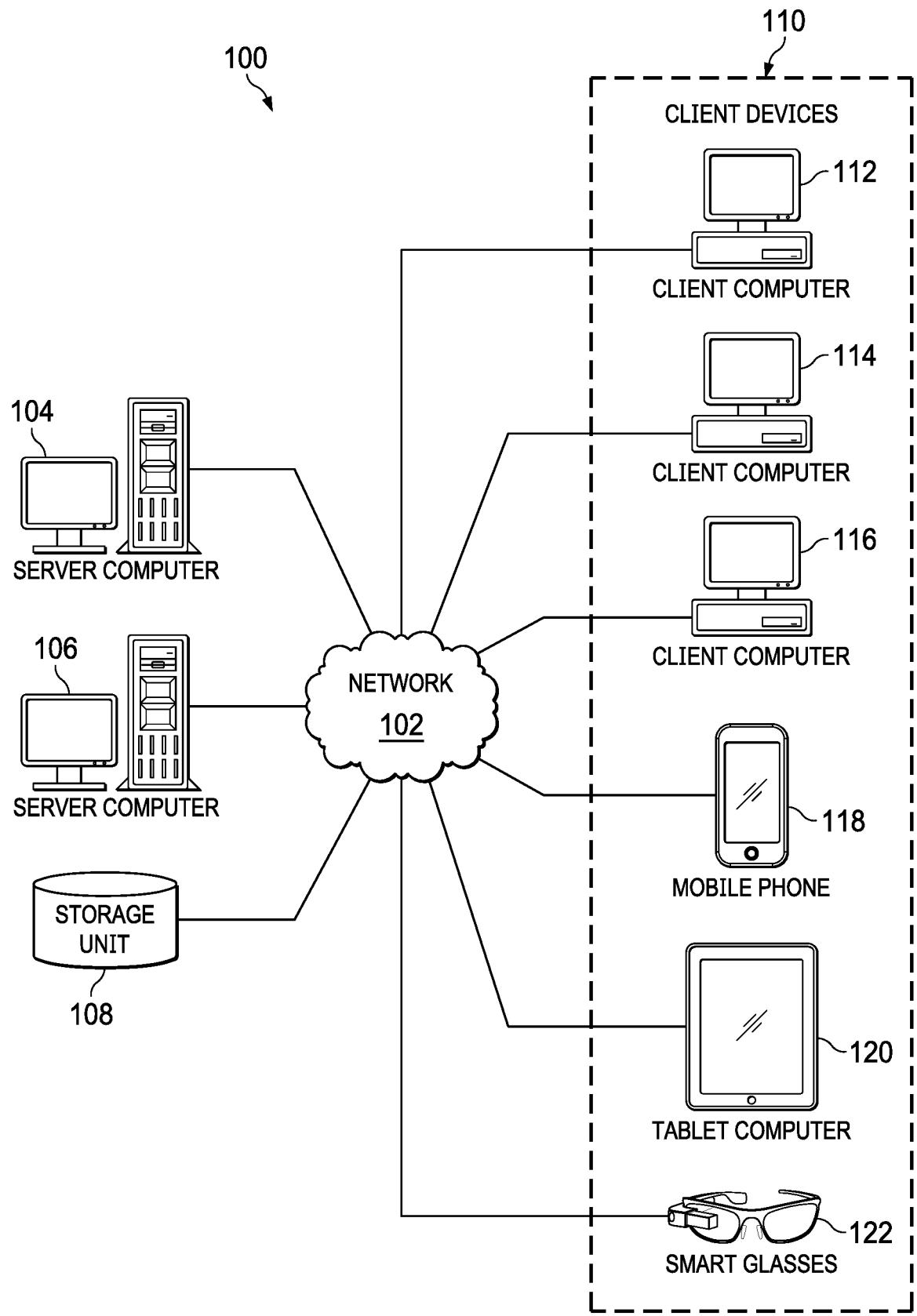
FIG. 1 is a pictorial representation of a network of data processing systems in which illustrative embodiments may be implemented.

The illustrative embodiments recognize and take into account one or more different considerations. For example, the illustrative embodiments recognize and take into account that many businesses and other organizations are committed to corporate social responsibility. Such businesses and other organizations would like to satisfy their corporate social responsibility commitments both effectively and efficiently. However, current systems and methods may not support the corporate social responsibility of organizations in a desired manner. For example, current human resource management systems do not provide desirable features to support the corporate social responsibility efforts of businesses and other organizations.

The illustrative embodiments also recognize and take into account that the corporate social responsibility commitments of an organization may be satisfied, at least in part, by contributions of employees of the organization to charitable operations. For example, it is desirable that employees are able to make contributions from their pay to charitable operations, to thereby support the corporate social responsibility of the organization.

The illustrative embodiments also recognize and take into account that human resource management systems may provide various employee self-service, automated payroll processing, and money movement functions. It is desirable that such functionality of human resource management systems may be leveraged in support of the corporate social responsibility of organizations. For example, it is desirable that employee self-service, automated payroll processing, and money movement functions of a human resource management system are configured to support the charitable donation of funds from employee pay to charitable activities.

The illustrative embodiments provide an automated system and method for employees to contribute from their pay to selected charitable projects. Illustrative embodiments provide an employee self-service user interface that allows employees to easily manage their contributions. Illustrative embodiments provide automated payroll processing and money movement to automatically withhold employee contributions from employee pay and ensure the secure transfer of funds to the selected charitable projects.

Illustrative embodiments provide a self-service user interface that allows an employee to create a charitable giving profile. The charitable giving profile for an employee contains parameters that describe the features of charitable projects of interest to the employee. Machine learning may be used to automatically match an employee with charitable projects by analyzing the charitable giving profile of the employee. Illustrative embodiments continuously learn from employee feedback to improve matching results.

Illustrative embodiments provide automated payroll processing of employee pay, including employee contributions from pay to selected charitable projects. For example, automatic payroll processing in accordance with an illustrative embodiment may be configured to include the details of employee charitable contributions from pay on employee pay statements and to generate the appropriate bank files to automatically withhold contributed funds from employee pay.

Illustrative embodiments also may provide automated money movement of funds contributed by employees of organizations to charitable projects. Money movement in accordance with illustrative embodiments may be configured to consolidate donations to a charitable project from employees in one or more organizations into a single efficient payment to the charitable project.

Illustrative embodiments may be implemented in, or in association with, any appropriate human resources management or automated payroll processing system. Illustrative embodiments provide various benefits to both organizations making charitable contributions and charitable projects receiving the contributions. For example, illustrative embodiments strengthen the corporate social responsibility position of organizations by making it easier for employees of the organizations to make and manage charitable contributions. Illustrative embodiments also reduce the overhead of distributing donated funds from employees to charitable operations and of receiving donated funds by charitable operations.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

As used herein, "a number of" when used with reference to items, means one or more items. For example, "a number of different types of networks" is one or more different types of networks.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

Network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
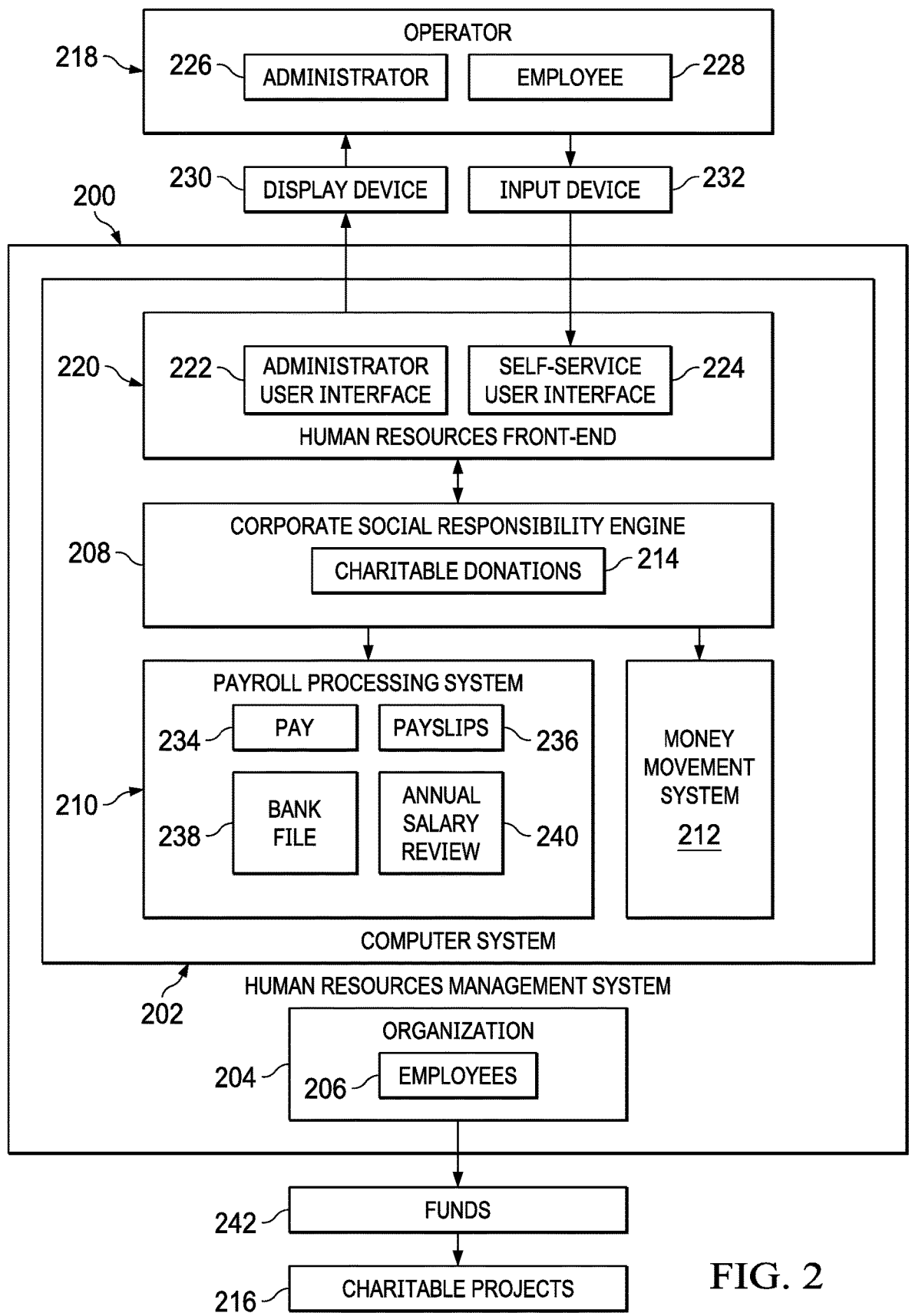
FIG. 2 is an illustration of a block diagram of a human resources management system in accordance with an illustrative embodiment.

Turning to FIG. 2, an illustration of a block diagram of a human resources management system is depicted in accordance with an illustrative embodiment. Human resources management system 200 may be implemented in a computer system, such as network data processing system 100 in FIG. 1.

In this illustrative example, human resources management system 200 is implemented using computer system 202. Computer system 202 is a physical hardware system and includes one or more data processing systems. When more than one data processing system is present in computer system 202, those data processing systems are in communication with each other using a communications medium. The communications medium can be a network. The data processing systems can be selected from at least one of a computer, a server computer, a tablet computer, or some other suitable data processing system.

Human resources management system 200 may be operated by or for organization 204. Organization 204 may be a business, non-profit organization, government entity, educational institution, or any other appropriate entity that has employees 206. For example, without limitation, organization 204 may be a service provider that provides some or all of the functions of human resources management system 200 for one or more other organizations.

Employees 206 includes individuals that work for organization 204, provide services to organization 204 under a contract or other agreement, or otherwise may be associated with organization 204 such that organization 204 makes payments to such individuals. For purposes of this application, including the claims, employees 206 are not limited to individuals that are considered employees under applicable law.

In accordance with an illustrative embodiment, human resources management system 200 includes corporate social responsibility engine 208, payroll processing system 210, and money movement system 212. Corporate social responsibility engine 208 is configured to assist employees 206 of organization 204 to make charitable contributions to charitable projects 216.

Charitable projects 216 may include any non-profit or other entity that may be designated by organization 204 or employees 206 to receive charitable contributions 214. Charitable projects 216 may perform good works in any appropriate field or area. For example, without limitation, charitable projects 216 may operate in areas such as the arts, education, housing, health, social welfare and the environment, and other appropriate areas.

Operator 218 may interact with corporate social responsibility engine 208 via human resources front-end 220. Corporate social responsibility engine 208 may be configured to generate appropriate user interfaces for operator 218 to interact with corporate social responsibility engine 208.

For example, without limitation, corporate social responsibility engine 208 may be configured to generate administrator user interface 222 and self-service user interface 234. Administrator user interface 222 may be used by administrator 226 to control various operations of corporate social responsibility engine 208, payroll processing system 210, or money movement system 212. Administrator 226 may be any appropriate operator 218 with the appropriate authority to control operation of human resources management system 200 or parts thereof. Self-service user interface 224 may be used by employee 228 to make and manage charitable donations 214 to charitable projects 216. Employee 228 may be any appropriate operator 218 who is one of employees 206 of organization 204. Functionality of administrator user interface 222 and self-service user interface 224 in accordance with an illustrative embodiment will be described in more detail below with reference to FIG. 3.

Administrator user interface 222 and self-service user interface 224 may be presented to operator 218 on any appropriate display device 230 and may receive input from operator 218 using any appropriate input device 232. Display device 230 and input device 232 may include any appropriate devices that may be configured to allow operator 218 to interact with administrator user interface 222 or self-service user interface 224. In some cases, display device 230 and input device 232 may be combined in one device, such as a touch screen display. For example, without limitation, display device 230 and input device 232 may be implemented as one of client devices 110 in network data processing system 100 in FIG. 1.

Payroll processing system 210 is configured to process automatically pay 234 for employees 206, including charitable donations 214 made by employees 206 from pay 234 using self-service user interface 234. Payroll processing system 210 may be configured to perform automatically any appropriate payroll processing functions. For example, without limitation, payroll processing system 210 may automatically generate payslips 236, bank file 238, and annual salary review 240 for employees 206. Payslips 236 may include a specification of charitable donations 214 from pay 234 that are made by employees 206 using self-service user interface 234. Bank file 238 may include pay-out instructions to a financial institution for payment of funds from pay 234 to employees 206 and charitable projects 216. Annual salary review 240 may include a report of the total charitable donations 214 made by employee 228 over a year, which may be used for tax reduction in some countries.

Money movement system 212 may be configured to distribute funds contributed from pay 234 of employees 206 of organization 204 using self-service user interface 234 to charitable projects 216. A detailed description of money movement system 212 in accordance with an illustrative embodiment is presented below with reference to FIG. 3.

Figure 3:
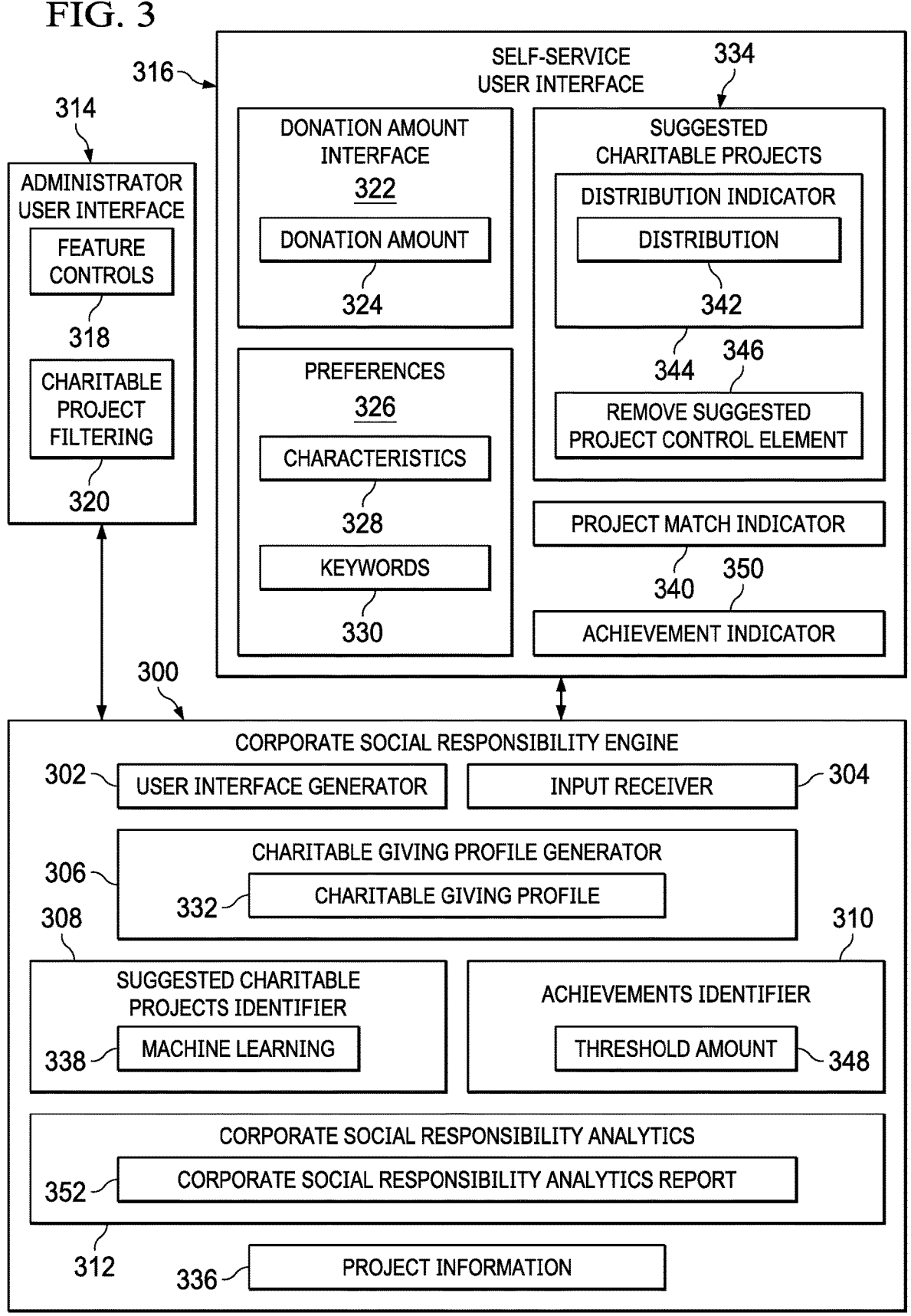
FIG. 3 is an illustration of a block diagram of a corporate social responsibility engine in accordance with an illustrative embodiment.

Turning to FIG. 3, an illustration of a block diagram of a corporate social responsibility engine is depicted in accordance with an illustrative embodiment. Corporate social responsibility engine 300 is an example of one implementation of corporate social responsibility engine 208 in FIG. 2. Corporate social responsibility engine 300 includes user interface generator 302, input receiver 304, charitable giving profile generator 306, suggested charitable projects identifier 306, achievements identifier 310, and corporate social responsibility analytics 312.

User interface generator 302 is configured to generate administrator user interface 314 and self-service user interface 316. Administrator user interface 314 is an example of one implementation of administrator user interface 222 in FIG. 2. Self-service user interface 316 is an example of one implementation of self-service user interface 224 in FIG. 2. Input receiver 304 is configured to receive input from an operator via administrator user interface 314 and self-service user interface 316.

Administrator user interface 314 may be configured to allow an operator to control various operations of corporate social responsibility engine 300. For example, without limitation, administrator user interface 314 may include feature controls 318 that enable an operator to enable and disable various features of corporate social responsibility engine 300 at the organizational level. As another example, administrator user interface 314 may be configured to allow an operator to perform charitable project filtering 320, whereby the operator may control the charitable projects to which the employees of an organization may contribute from their pay.

Self-service user interface 316 is configured to be used by an employee operator to make and manage charitable contributions from pay. For example, without limitation, self-service user interface 316 may include donation amount interface 322. Donation amount interface 322 is configured to prompt an operator to select or enter donation amount 324. Donation amount 234 is any appropriate amount that the operator is donating from pay to charitable projects. Donation amount interface 322 also may prompt the operator to indicate how often donation amount 324 is to be taken from pay for the charitable projects.

Self-service user interface 316 also prompts an operator to indicate preferences for charitable operations. For example, preferences 326 may be indicating by selecting how important various characteristics 328 of charitable operations are to the operator. Preferences 326 also may be indicated by keywords 330 entered by the operator.

Charitable giving profile generator 306 is configured to generate charitable giving profile 332 for an operator based on preferences 326 indicated by the operator. Suggested charitable projects identifier 308 then identifies suggested charitable projects 334 for the operator by searching project information 336 for charitable projects that match charitable giving profile 332 for the operator. For example, without limitation, suggested charitable projects identifier 306 may use machine learning 338 to identify suggested charitable projects 334 using charitable giving profile 332. Suggested charitable projects 334 identified by suggested charitable projects identifier 308 may be displayed on self-service user interface 316.

Suggested charitable projects identifier also may determine distribution 342 of donation amount 324 among suggested charitable projects 334. Distribution 342 may be indicated by any appropriate distribution indicator 344 on self-service user interface 316.

Suggested charitable projects identifier 308 also may be configured to determine how well suggested charitable projects 334 presented on self-service user interface 316 match charitable giving profile 332 for an operator. Any appropriate project match indicator 340 may be displayed on self-service user interface 316 to indicate how well suggested charitable projects 334 presented on self-service user interface 316 match charitable giving profile 332 for an operator.

Remove suggested project control element 346 may be provided on self-service user interface 316 for each of suggested charitable projects 334 displayed on self-service user interface. An operator may select remove suggested project control element 346 for one of the displayed suggested charitable projects 334 that the operator does not like. In this case, suggested charitable projects identifier 308 will identify another suggested charitable project to present on self-service user interface 316. This feedback from the operator may also be used to improve future selections of suggested charitable projects 334 by suggested charitable projects identifier 308.

Achievements identifier 310 is configured to determine whether donation amount 324 is greater than threshold amount 348. In response to a determination that donation amount 324 is greater than threshold amount 348, an appropriate achievement indicator 350 may be displayed on self-service user interface 316.

Corporate social responsibility analytics 312 is configured to generate corporate social responsibility analytics report 352. Corporate social responsibility analytics report 352 may include organizational level information regarding the charitable contributions of the employees of an organization. Corporate social responsibility analytics report 352 also may include information regarding the charitable contributions of employees of several organizations.

Figure 4:
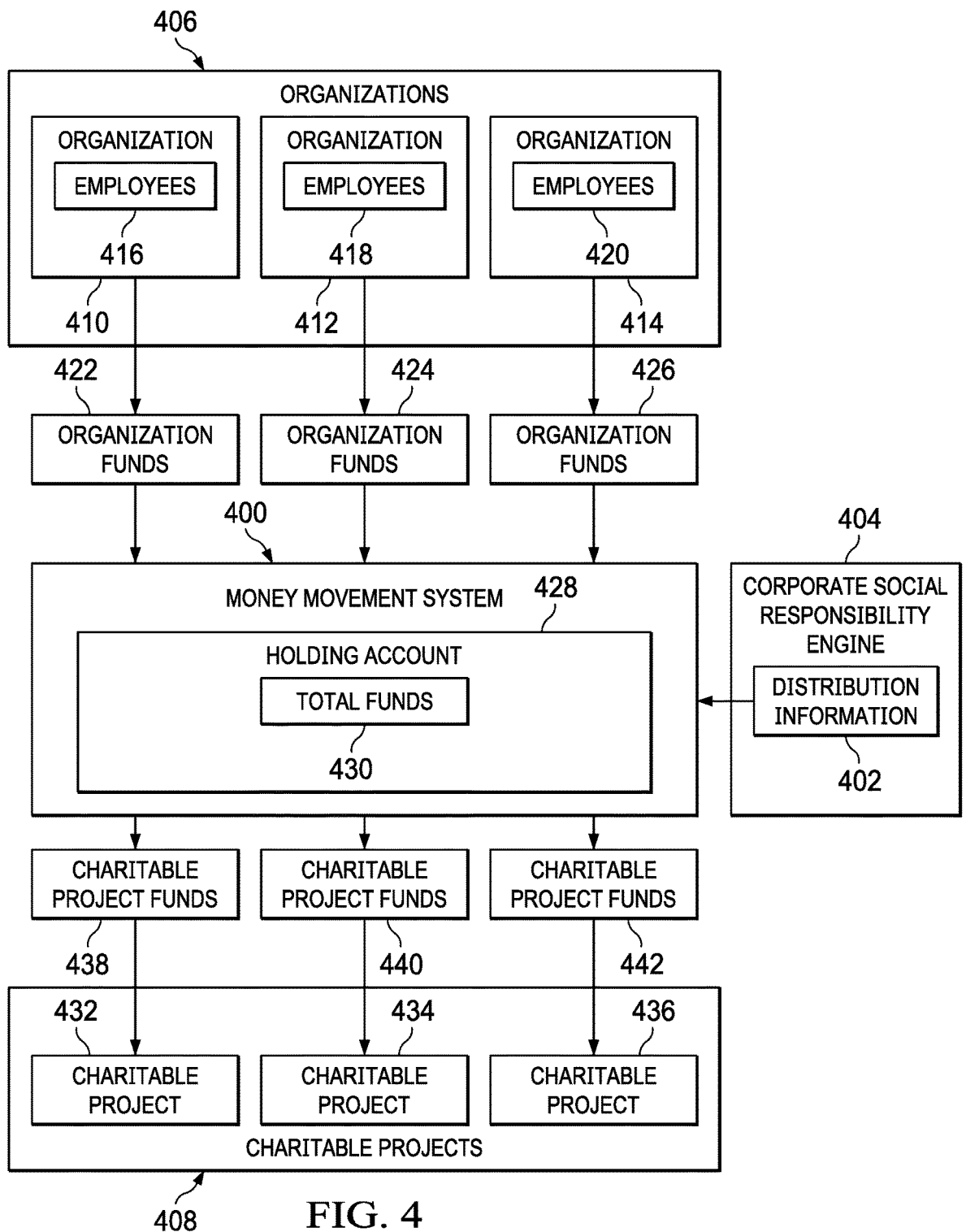
FIG. 4 is an illustration of a block diagram of money movement in accordance with an illustrative embodiment.

Turning to FIG. 4, an illustration of a block diagram of money movement is depicted in accordance with an illustrative embodiment. Money movement system 400 is an example of one implementation of money movement system 212 in FIG. 2.

Money movement system 400 is configured to receive distribution information 402 from corporate social responsibility engine 404. Distribution information 402 identifies the distribution of charitable donations from employees of organizations 406 to charitable projects 408. For example, organizations 406 may include organization 410 having employees 416, organization 412 having employees 418, and organization 414 having employees 420.

Organization funds 422 are the total funds donated by employees 416 of organization 410. Organization funds 424 are the total funds donated by employees 418 of organization 412. Organization funds 426 are the total funds donated by employees of organization 414. In accordance with an illustrative embodiment, money movement system 400 is configured to receive organization funds 422, organization funds 424, and organization funds 426 and to hold the received funds in holding account 428 as total funds 430.

Money movement system 400 is configured to use distribution information 402 to distribute total funds 430 to charitable projects 408. In this example, charitable project funds 438 are delivered to charitable project 432, charitable project funds 440 are delivered to charitable project 434, and charitable project funds 442 are delivered to charitable project 436.

The illustration of the different components in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 5:
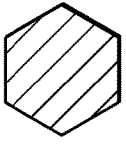
FIG. 5 is an illustration of a self-service user interface in accordance with an illustrative embodiment.

Turning to FIG. 5, an illustration of a self-service user interface is depicted in accordance with an illustrative embodiment. Self-service user interface 500 is an example of one implementation of self-service user interface 224 in FIG. 2 and self-service user interface 316 in FIG. 3.

In this example, donation amount interface 502 prompts an operator to select or enter a donation amount. Virtual radio buttons allow the operator to indicate whether the donation amount is a single donation 504 or a recurring donation 506.

Self-service user interface 500 also prompts an operator to indicate preferences 508 for charitable projects. In this example, preferences 508 may be indicated by using virtual sliders 510 to indicate levels of interest in various characteristics 512 of charitable operations. Keyword box 514 allows the operator to enter keywords that describe charitable projects of interest to the operator.

Project information 516 for suggested projects is displayed in self-service user interface 500. Project match indicator 518 indicates how well the displayed suggested projects match operator preferences as indicated in a charitable giving profile for the operator.

Distribution indictor 520 indicates the distribution of the donation amount among suggested charitable projects in a pie chart format. The distribution also is indicated by displaying a specific amount 522 to be provided to each suggested charitable project.

Remove button 524 allows an operator to remove a displayed suggested charitable project to replace it with another suggested charitable project.

Achievement indicator 526 indicates whether the amount of donations made by an operator is greater than a threshold amount.

Selecting virtual button 528 by an operator saves the contribution information displayed in self-service user interface 500. Selecting virtual button 528 allows the operator to reset the information displayed in self-service user interface 500.

Figure 6:
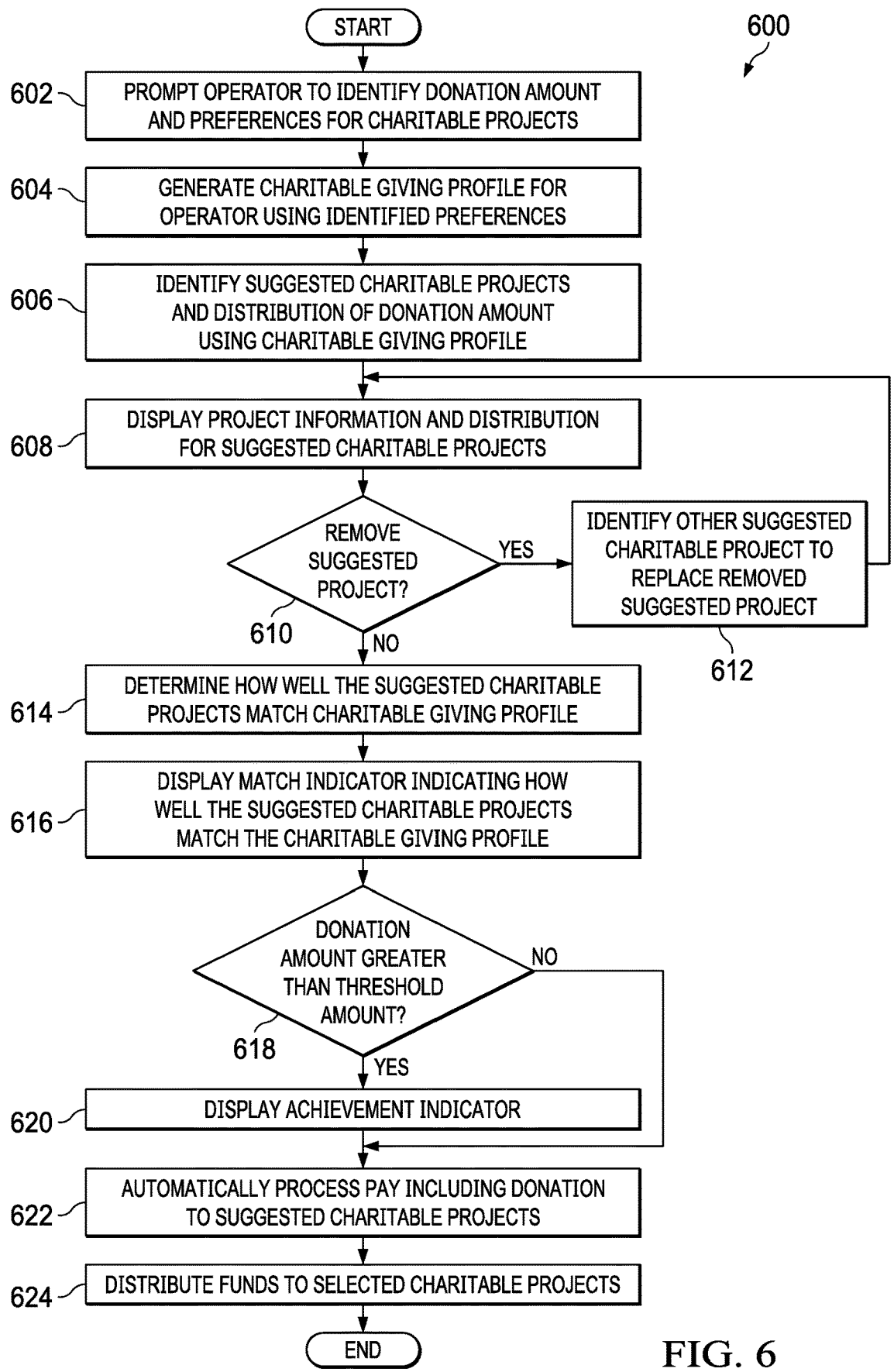
FIG. 6 is an illustration of a flowchart of a process of payroll processing for charitable contributions in accordance with an illustrative embodiment.

Turning to FIG. 6, an illustration of a flowchart of a process of payroll processing for charitable contributions is depicted in accordance with an illustrative embodiment. Process 600 may be implemented in corporate social responsibility engine 208 and payroll processing system 210 in FIG. 2.

Process 600 begins with prompting an operator to identify a donation amount and preferences for charitable projects (operation 602). A charitable giving profile for the operator is then generated using the preferences identified by the operator (operation 604). Suggested charitable projects and a distribution of the donation amount among the suggested charitable projects is then identified for the operator using the charitable giving profile (operation 606). Project information and the distribution for the suggested charitable projects is then displayed to the operator (operation 608).

It then may be determined whether the operator has indicated that a displayed suggested charitable project should be removed (operation 610). In response to a determination that a suggested project should be removed, another suggested charitable project is identified to replace the removed project (operation 612). Process 600 then returns to operation 608, where project information and the distribution for the new suggested charitable project is displayed.

In response to a determination at operation 610 that a suggested charitable project should not be removed, it may be determined how well the suggested charitable projects match the operation charitable giving profile (operation 614). A match indicator indicating how well the suggested charitable projects match the charitable giving profile then may be displayed (operation 616).

It then may be determined whether a donation amount by the operator is greater than a threshold amount (operation 618). In response to a determination that the donation amount is greater than the threshold amount an achievement indicator is displayed (operation 620).

Pay for the operator, including the indicated donation to suggested charitable projects, is automatically processed (operation 622). Funds for the donations are distributed to the selected charitable projects (operation 624), with the process terminating thereafter.

Turning to FIG. 7, an illustration of a flowchart of a process for distributing funds to charitable operations is depicted in accordance with an illustrative embodiment. Process 700 is an example of one implementation of operation 624 in process 600 in FIG. 6. Process 700 may be implemented, for example, in money movement system 212 in FIG. 2.

Process 700 begins with receiving distribution information (operation 702). The distribution information indicates the distribution of charitable contributions of employees from one or more organizations to various charitable operations. Funds from the organizations for the charitable contributions are received (operation 704). The funds are then distributed to the charitable operations using the distribution information (operation 706), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

Turning now to FIG. 8, an illustration of a block diagram of a data processing system is depicted in accordance with an illustrative embodiment. Data processing system 800 may be used to implement one or more of server computer 104 in FIG. 1, server computer 106 in FIG. 1, client devices 110 in FIG. 1, human resources management system 200 in FIG. 2, and computer system 203 in FIG. 2. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation. In an embodiment, processor unit 804 comprises one or more conventional general purpose central processing units (CPUs). In an alternate embodiment, processor unit 804 comprises one or more graphical processing units (CPUs).

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818. Alternatively, program code 818 may be transferred to data processing system 800 using computer-readable signal media 826.

Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, "computer-readable media 820" can be singular or plural. For example, program code 818 can be located in computer-readable media 820 in the form of a single storage device or system. In another example, program code 818 can be located in computer-readable media 820 that is distributed in multiple data processing systems. In other words, some instructions in program code 818 can be located in one data processing system while other instructions in program code 818 can be located in another data processing system. For example, a portion of program code 818 can be located in computer-readable media 820 in a server computer while another portion of program code 818 can be located in computer-readable media 820 located in a set of client computers.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An automated method of matching donors and charitable projects, comprising:
using a number of processors of a machine learning predictive modeling system to perform the steps of:
displaying a self-service user interface configured to prompt an operator to identify preferences for charitable projects;
receiving the preferences for charitable projects identified by the operator via the self-service user interface;
generating a charitable giving profile for the operator from the preferences for charitable projects identified by the operator;
identifying, by a machine learning model, suggested charitable projects for the operator using the charitable giving profile for the operator;
displaying, on the self-service user interface, project information for the suggested charitable projects;
receiving, from the operator via the self-service user interface, selections of approved charitable projects and donation amounts from the suggested charitable projects;
training of the machine learning model in response to receiving from the operator via the self-service interface selections of approved and rejected charitable projects and donation amounts from the suggested charitable projects; and
automatically processing, by a computer system, pay for the operator including a donation of funds from the pay for the operator to the suggested charitable projects selected by the operator.

2. The method of claim 1, wherein displaying the self-service user interface comprises displaying a plurality of virtual sliders comprising a virtual slider for each characteristic of a charitable project in a plurality of characteristics of charitable projects, wherein the operator is prompted to identify a level of preference for each characteristic of a charitable project in the plurality of characteristics of charitable projects using the corresponding virtual slider for each characteristic of a charitable project.

3. The method of claim 1, wherein displaying the self-service user interface comprises displaying a keyword box, wherein the operator is prompted to enter keywords describing the preferences for charitable projects in the keyword box.

4. The method of claim 1 further comprising using machine learning to identify the suggested charitable projects for the operator.

5. The method of claim 1, further comprising:
displaying, by the computer system, on the self-service user interface, a donation amount interface configured to prompt the operator to identify a donation amount;
receiving, by the computer system, the donation amount identified by the operator via the donation amount interface;
determining, by the computer system, a distribution of the donation amount among the suggested charitable projects for the operator using the charitable giving profile for the operator; and
displaying, by the computer system, on the self-service user interface, a funds distribution indicator that indicates the distribution of the donation amount among the suggested charitable projects for the operator.

6. The method of claim 1 further comprising:
determining, by the computer system, how well the suggested charitable projects match the charitable giving profile for the operator; and
displaying, by the computer system, on the self-service user interface, a project match indicator that indicates how well the suggested charitable projects match the charitable giving profile for the operator.

7. The method of claim 1 further comprising:
displaying, by the computer system, on the self-service user interface, a remove suggested project control element for each of the suggested charitable projects;
in response to a selection of the remove suggested project control element for one of the suggested charitable projects:
stopping displaying, by the computer system, the project information for the suggested charitable project corresponding to the remove suggested project control element selected;
identifying, by the computer system, another suggested charitable project for the operator using the charitable giving profile for the operator; and
displaying, by the computer system, on the self-service user interface, project information for the other suggested charitable project.

8. The method of claim 1 further comprising:
determining, by the computer system, a donation amount by the operator;
determining, by the computer system, whether the donation amount by the operator is greater than a threshold amount; and
in response to a determination that the donation amount is greater than the threshold amount, displaying, by the computer system, on the self-service user interface, an achievement indicator that indicates that the operator has achieved a level of charitable giving.

9. The method of claim 1 further comprising automatically distributing, by the computer system, funds from the pay for the operator to the suggested charitable projects.

10. An automated machine learning predictive modeling system for matching donors and charitable projects, comprising:
a computer system;
a processor unit; and
a corporate social responsibility system in communication with the processor unit,
wherein the corporate social responsibility system comprises:
a user interface generator configured to generate a self-service user interface for display on a display device, wherein the self-service user interface is configured to prompt an operator to identify preferences for charitable projects and includes a display of project information for suggested charitable projects for the operator;
an input receiver configured to receive the preferences for charitable projects identified by the operator via the self-service user interface;
a charitable giving profile generator configured to generate a charitable giving profile for the operator from the preferences for charitable projects identified by the operator;
a suggested charitable projects identifier configured to identify using a machine learning model the suggested charitable projects for the operator using the charitable giving profile for the operator;

a distribution indicator configured to identify suggested charitable projects and donation amounts approved by the operator for distribution via the self-service user interface;

training of the machine learning model in the suggested charitable projects identifier in response to receiving from the operator via the self-service interface selections of approved and rejected charitable projects and donation amounts from the suggested charitable projects; and a payroll processing system for processing pay for the operator including a donation of funds from the pay for the operator to the suggested charitable projects selected by the operator.

11. The system of claim 10, wherein the user interface generator is configured to display, on the self-service user interface, a plurality of virtual sliders comprising a virtual slider for each characteristic of a charitable project in a plurality of characteristics of charitable projects, wherein the operator is prompted to identify a level of preference for each characteristic of a charitable project in the plurality of characteristics of charitable projects using the corresponding virtual slider for each characteristic of a charitable project.

12. The system of claim 10, wherein the user interface generator is configured to display, on the self-service user interface, a keyword box, wherein the operator is prompted to enter keywords describing the preferences for charitable projects in the keyword box.

13. The system of claim 10, wherein the suggested charitable projects identifier uses machine learning to identify the suggested charitable projects for the operator.

14. The system of claim 10, wherein:

the user interface generator is configured to display, on the self-service user interface, a donation amount interface configured to prompt the operator to identify a donation amount and a funds distribution indicator that indicates a distribution of the donation amount among the suggested charitable projects for the operator;

the input receiver is configured to receive the donation amount identified by the operator via the donation amount interface; and the suggested charitable projects identifier is configured to determine the distribution of the donation amount among the suggested charitable projects for the operator using the charitable giving profile for the operator.

15. The system of claim 10, wherein:

the suggested charitable projects identifier is configured to determine how well the suggested charitable projects match the charitable giving profile for the operator; and the user interface generator is configured to display, on the self-service user interface, a project match indicator that indicates how well the suggested charitable projects match the charitable giving profile for the operator.

16. The system of claim 10, wherein:

the user interface generator is configured to display, on the self-service user interface, a remove suggested project control element for each of the suggested charitable projects and, in response to a selection of the remove suggested project control element for one of the suggested charitable projects, to stop displaying the project information for the suggested charitable project corresponding to the remove suggested project control element selected and to display, on the self-service user interface, project information for another suggested charitable project; and the suggested charitable projects identifier is configured to, in response to the selection of the remove suggested project control element, identify the other suggested charitable project for the operator using the charitable giving profile for the operator.

17. The system of claim 10 further comprising:

an achievements calculator configured to determine whether a donation amount by the operator is greater than a threshold amount; and wherein the user interface generator is configured to display, on the self-service user interface, in response to a determination that the donation amount is greater than the threshold amount, an achievement indicator that indicates that the operator has achieved a level of charitable giving.

18. The system of claim 10 further comprising a money movement system configured to distribute funds from the pay for the operator to the suggested charitable projects.

* * * * *